United States Patent
Seo et al.

(10) Patent No.: US 9,532,394 B2
(45) Date of Patent: Dec. 27, 2016

(54) METHOD AND APPARATUS FOR CARRYING OUT DEVICE-TO-DEVICE COMMUNICATION IN WIRELESS COMMUNICATION SYSTEM

(71) Applicant: LG ELECTRONICS INC., Seoul (KR)

(72) Inventors: Inkwon Seo, Anyang-si (KR); Hanbyul Seo, Anyang-si (KR); Hakseong Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/413,992

(22) PCT Filed: Jul. 12, 2013

(86) PCT No.: PCT/KR2013/006265
§ 371 (c)(1),
(2) Date: Jan. 9, 2015

(87) PCT Pub. No.: WO2014/010988
PCT Pub. Date: Jan. 16, 2014

(65) Prior Publication Data
US 2015/0296558 A1    Oct. 15, 2015

Related U.S. Application Data

(60) Provisional application No. 61/671,064, filed on Jul. 12, 2012.

(51) Int. Cl.
*H04W 4/00*    (2009.01)
*H04W 76/04*    (2009.01)
(Continued)

(52) U.S. Cl.
CPC .......... *H04W 76/043* (2013.01); *H04W 24/08* (2013.01); *H04W 72/1284* (2013.01);
(Continued)

(58) Field of Classification Search
CPC ...... H04W 84/12; H04W 80/04; H04W 84/18; H04W 88/06; H04W 74/08
See application file for complete search history.

(56) References Cited

U.S. PATENT DOCUMENTS 6,738,379 B1 *    5/2004    Balazinski .............. H04L 29/06
370/394
2004/0235489 A1    11/2004    Kwon
(Continued)

FOREIGN PATENT DOCUMENTS

KR    10-0547116 B1    1/2006
KR    10-2012-0074254 A    7/2012
(Continued)

*Primary Examiner* — Hassan Phillips
*Assistant Examiner* — Siren Wei
(74) *Attorney, Agent, or Firm* — Birch, Stewart, Kolasch & Birch, LLP

(57) ABSTRACT

One embodiment of the present invention is a method for carrying out device-to-device communication by means of a first terminal in a wireless communication system, the method comprising: a step of measuring a link with a second terminal; and a step of transmitting, if the result of the link measurement satisfies a predetermined condition, a link failure declaration to a third terminal. The link failure declaration includes buffer status information relating to the data being received from the second terminal. The first terminal receives the remaining portion of the data from the third terminal.

13 Claims, 6 Drawing Sheets

(51) Int. Cl.
*H04W 24/08* (2009.01)
*H04W 72/12* (2009.01)
*H04W 76/02* (2009.01)
H04L 12/721 (2013.01)
H04L 12/703 (2013.01)

(52) U.S. Cl.
CPC ......... *H04W 76/028* (2013.01); *H04W 76/04* (2013.01); *H04L 45/28* (2013.01); *H04L 45/70* (2013.01)

(56) References Cited

U.S. PATENT DOCUMENTS

| | | | |
|---|---|---|---|
| 2006/0187846 A1* | 8/2006 | Pelletier | H04W 28/06 370/252 |
| 2010/0261469 A1 | 10/2010 | Ribeiro et al. | |
| 2012/0020213 A1* | 1/2012 | Horneman | H04W 76/043 370/231 |
| 2012/0213107 A1* | 8/2012 | Jang | H04W 24/10 370/252 |
| 2012/0224472 A1* | 9/2012 | Kim | H04W 24/04 370/226 |
| 2013/0121296 A1 | 5/2013 | Jung et al. | |
| 2014/0023008 A1 | 1/2014 | Ahn et al. | |

FOREIGN PATENT DOCUMENTS

| | | | |
|---|---|---|---|
| WO | WO 2007/066882 A1 | 6/2007 | |
| WO | WO 2010/116220 A1 | 10/2010 | |
| WO | WO 2011069295 A1 * | 6/2011 | ........ H04W 72/0406 |
| WO | WO 2012/011786 A2 | 1/2012 | |
| WO | WO 2012/091420 A2 | 7/2012 | |

\* cited by examiner

FIG. 5
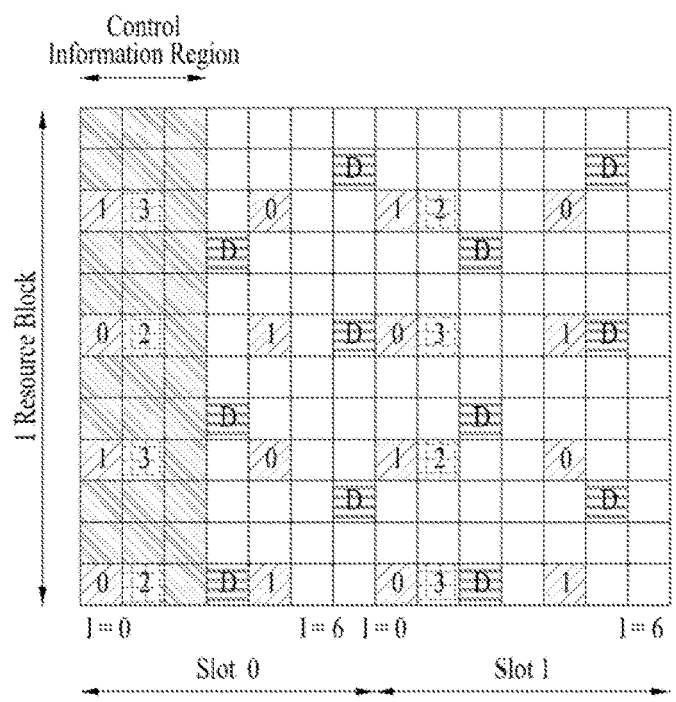
(a)
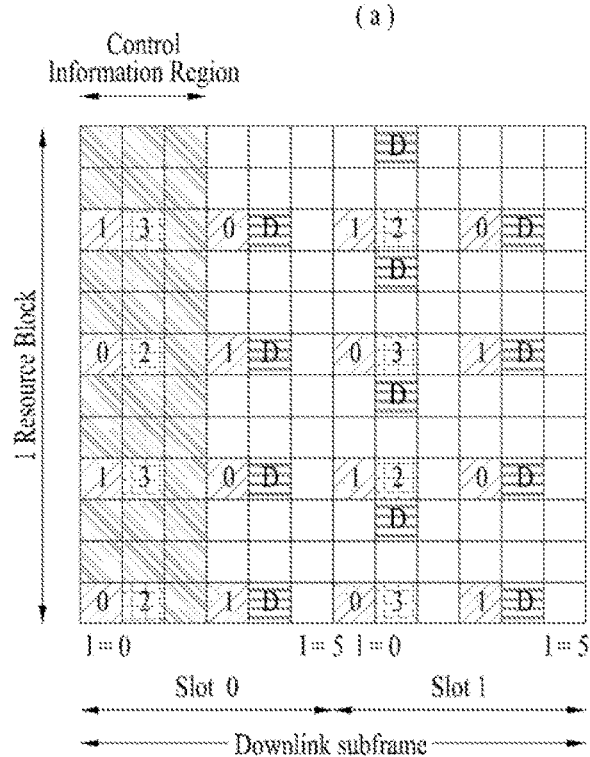
(b)

METHOD AND APPARATUS FOR CARRYING OUT DEVICE-TO-DEVICE COMMUNICATION IN WIRELESS COMMUNICATION SYSTEM

CROSS REFERENCE TO RELATED APPLICATIONS

This application is the National Phase of PCT International Application No. PCT/KR2013/006265, filed on Jul. 12, 2013, which claims priority under 35 U.S.C. 119(e) to U.S. Provisional Application No. 61/671,064, filed on Jul. 12, 2012, all of which are hereby expressly incorporated by reference into the present application.

TECHNICAL FIELD

This disclosure relates to a wireless communication system, and more particularly, to a method for measurement and communication associated therewith in device-2-device (D2D) communication.

BACKGROUND ART

Wireless communication systems are widely deployed to provide various kinds of communication services such as voice and data services. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

Device-to-device (D2D) communication represents a communication scheme of establishing a direct link between user equipments (UEs) such that the UEs directly exchange services such as voice and data services without assistance from an evolved NodeB (eNB). D2D communication may include UE-to-UE communication and peer-to-peer communication. In addition, the D2D communication scheme may be applied to machine-to-machine (M2M) communication, machine type communication (MTC), etc.

D2D communication is considered as one measure to address load to an eNB according to rapidly increasing data traffic. For example, according to D2D communication, since devices exchange data directly, not through an eNB as in the conventional wireless communication systems, network load may be reduced. In addition, with introduction of D2D communication, the procedures for the eNB may be simplified, power consumption of devices participating in D2D communication may be reduced, data transmission rate may increase, the capacity of a network may increase, load may be distributed, and cell coverage may be extended.

DISCLOSURE

Technical Problem

An object of the present invention is to provide a method for carrying out communication when a D2D link is monitored and link failure is declared.

It is to be understood that technical objects to be achieved by the present invention are not limited to the aforementioned technical object and other technical objects which are not mentioned herein will be apparent from the following description to one of ordinary skill in the art to which the present invention pertains.

Technical Solution

In a first aspect of the present invention, provided herein is a method for carrying out device-to-device (D2D) communication by a first terminal in a wireless communication system, the method including measuring a link with a second terminal, and transmitting a link failure declaration to a third terminal when a result of the measuring satisfies a predetermined condition, wherein the link failure declaration includes buffer state information related to data being received from the second terminal, wherein the first terminal receives a remaining part of the data from the third terminal.

The first aspect of the present invention may include the following details.

The buffer state information may be delivered from the third terminal to the second terminal The remaining part of the data may be transmitted to the third terminal by the second terminal based on the buffer state information The predetermined condition may be that a block error rate (BLER) of a control signal becomes less than or equal to a predetermined value.

The buffer state information may be an index of a packet successfully received from the second terminal.

The buffer state information may be either a transmission block index or an IP packet sequence number.

The measuring of the link may be performed for a time-frequency resource indicated by either the second terminal or the third terminal.

In a second aspect of the present invention, provided herein is a method for carrying out device-to-device (D2D) communication by a third terminal in a wireless communication system, the method including receiving a link failure declaration from a first terminal, wherein the link failure declaration includes buffer state information related to data being received from a second terminal by the first terminal, wherein the third terminal transmits a remaining part of the data to the first terminal.

The second aspect of the present invention may include the following details.

The method may further include transmitting the buffer state information to the second terminal.

The remaining part of the data may be transmitted to the third terminal by the second terminal based on the buffer state information.

The link failure declaration may be transmitted when a block error rate (BLER) of a control signal is less than or equal to a predetermined value as a result of link measurement of the first terminal.

The buffer state information may be an index of a packet successfully received from the second terminal.

The buffer state information may be either a transmission block index or an IP packet sequence number.

The method may further include transmitting, to the first terminal, a time-frequency resource for the first terminal measuring a link with the second terminal.

Advantageous Effects

According to embodiments of the present invention, data may be received with continuity even if link failure is declared according to change in D2D link quality.

It will be appreciated by those skilled in the art that the effects that can be achieved with the present invention are not limited to what has been described above and other advantages of the present invention will be clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention. In the drawings:

FIG. 5 is a diagram illustrating a reference signal;

BEST MODE

Figure 1:
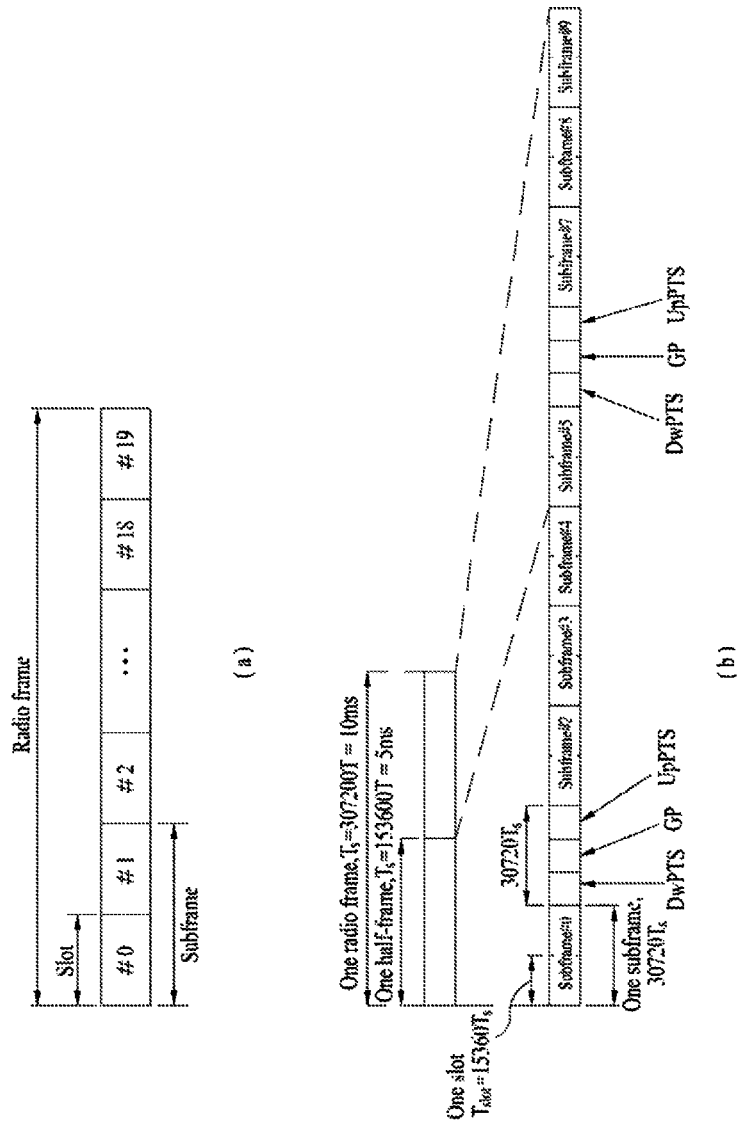
FIG. 1 illustrates a radio frame structure.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

3GPP LTE/LTE-A system to which the present invention may be applied

A structure of a radio frame will be described with reference to FIG. 1.

In a cellular OFDM communication system, uplink/downlink data packet transmission is performed in a subframe unit, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
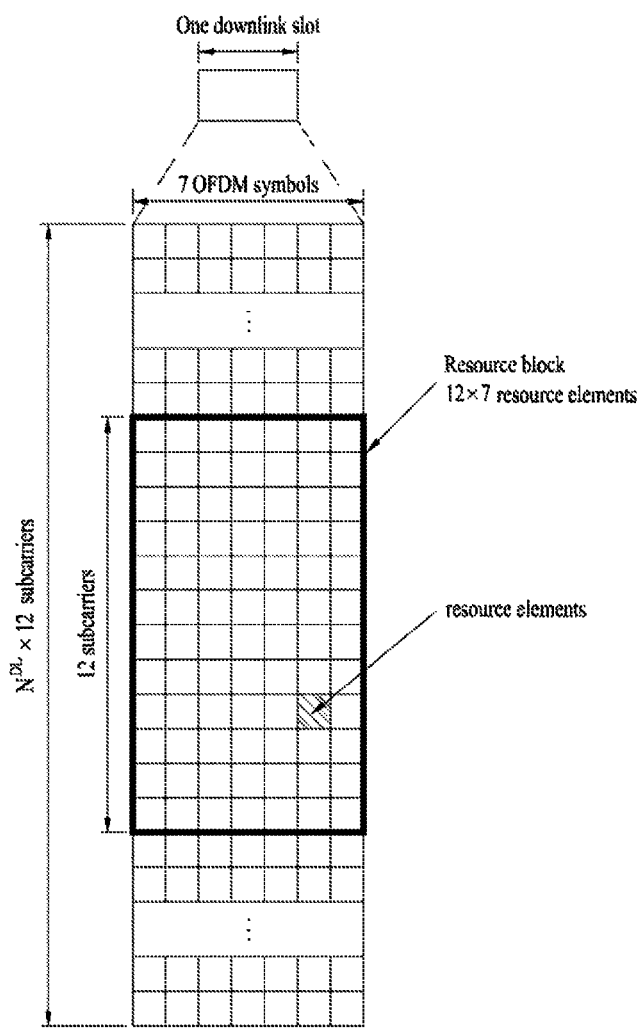
FIG. 2 is a diagram illustrating a resource grid for one downlink (DL) slot.

FIG. 2 is a diagram illustrating a resource grid at a downlink slot. One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7(6) resource elements. The number $N_{DL}$ of resource blocks (RBs) included in the downlink slot depends on a downlink transmission bandwidth. A structure of an uplink slot may be the same as that of the downlink slot.

Figure 3:
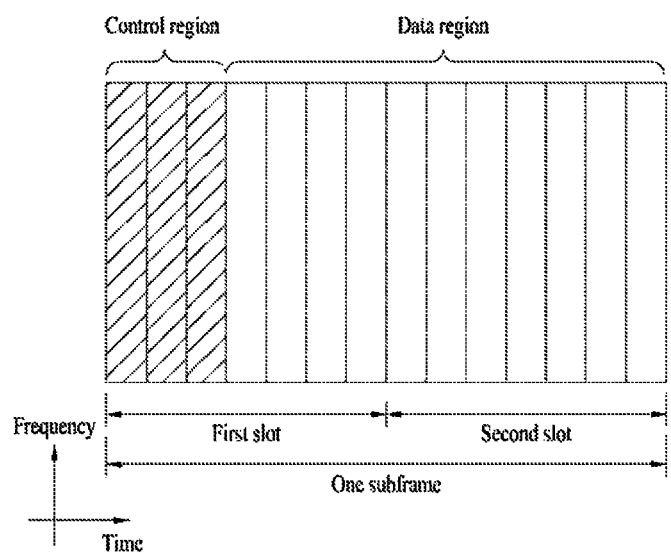
FIG. 3 is a diagram illustrating a DL subframe structure.

FIG. 3 is a diagram illustrating a structure of a downlink subframe. Maximum three OFDM symbols located at the front of the first slot within the subframe correspond to a control region to which a control channel is allocated. The other OFDM symbols correspond to a data region to which a physical downlink shared channel (PDCCH) is allocated.

Examples of the downlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control command of an individual user equipment within a random user equipment group, transmission power control information, and activation of voice over Internet protocol (VoIP). A plurality of PDCCHs may be transmitted within the control region. The user equipment may monitor the plurality of PDCCHs. The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE. The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
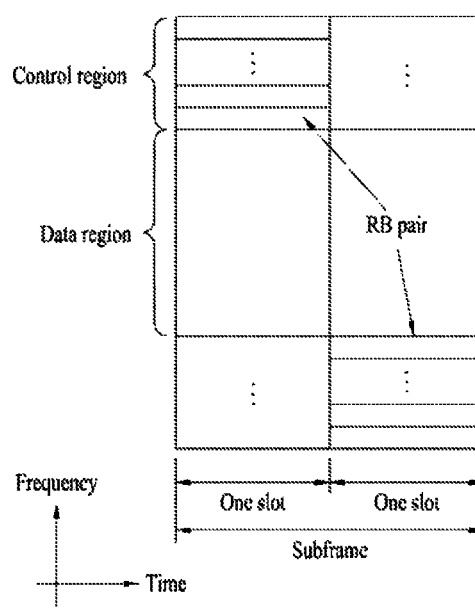
FIG. 4 is a diagram illustrating an uplink (UL) subframe structure.

FIG. 4 is a diagram illustrating a structure of an uplink subframe. The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUSCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Reference Signal (RS)

In the wireless communication system, since a packet is transmitted through a radio channel, signal distortion may occur during transmission of the packet. In order to normally receive the distorted signal in a receiving side, distortion of the received signal should be compensated using channel information. In order to discover the channel information, it is required to transmit the signal known by both a transmitting side and the receiving side and discover the channel information using a distortion level of the signal when the signal is transmitted through the channel. In this case, the signal known by both the transmitting side and the receiving side will be referred to as a pilot signal or a reference signal.

In case that multiple antennas are used to transmit and receive data, a channel status between each transmitting antenna and each receiving antenna should be known to receive a normal signal. Accordingly, a separate reference signal should exist per transmitting antenna, in more detail, per antenna port.

The reference signal may be divided into an uplink reference signal and a downlink reference signal. In the current LTE system, the uplink reference signal may include:

i) a demodulation reference signal (DM-RS) for channel estimation for coherent demodulation of information transmitted through the PUSCH and the PUCCH; and ii) a sounding reference signal (SRS) for allowing a base station to measure uplink channel quality at frequencies of different networks.

Meanwhile, the downlink reference signal may include:

i) a cell-specific reference signal (CRS) shared among all the user equipments within the cell;

ii) a user equipment (UE)-specific reference signal for a specific user equipment only;

iii) a demodulation reference signal (DM-RS) for coherent demodulation if the PDSCH is transmitted;

iv) channel state information-reference signal (CSI-RS) for transferring channel state information (CSI) if a downlink DMRS is transmitted;

v) a multimedia broadcast single frequency network (MBSFN) reference signal transmitted for coherent demodulation for a signal transmitted in an MBSFN mode; and vi) a positioning reference signal used to estimate geographic position information of the user equipment.

The RSs may be broadly divided into two reference signals according to the purposes thereof. One is used to acquire channel information and the other is used for data demodulation. Since the former is used when the UE acquires channel information on DL, this RS should be transmitted over a wide band and even a UE which does not receive DL data in a specific subframe should receive the RS. This RS is also applied to situations such as handover. The latter RS is sent by the BS along with a resource on DL. The UE may receive the RS to perform channel measurement to implement data modulation. This RS should be transmitted in a region in which data is transmitted.

The CRS is used for two purposes, namely, acquisition of channel information and data demodulation, and the UE-specific RS is used only for data demodulation. The CRS is transmitted in every subframe in a wide band and RSs for up to four antenna ports are transmitted according to the number of transmit antennas of the BS.

For example, if the number of transmit antennas of the BS is 2, CRSs for antenna ports 0 and 1 are transmitted. If the number of transmit antennas of the BS is 4, CRSs for antenna ports 0 to 3 are respectively transmitted.

FIG. 5 is a diagram illustrating a pattern in which CRSs and DRSs defined in a legacy 3GPP LTE system (e.g., Release-8) are mapped to resource block (RB) pairs. A downlink RB pair, as a unit to which an RS is mapped, may be represented as a unit of one subframe in the time domain times 12 subcarriers in the frequency domain. That is, one RB pair has a length of 14 OFDM symbols for a normal CP (FIG. 5(a)) and a length of 12 OFDM symbols for an extended CP (FIG. 5(b)).

FIG. 5 shows locations of RSs on RB pairs in a system in which the BS supports four transmit antennas. In FIG. 5, resource elements (REs) denoted by "0", "1", "2" and "3" represent the locations of the CRSs for antenna port indexes 0, 1, 2 and 3, respectively. In FIG. 5, REs denoted by "D" represent locations of the DMRSs.

Measurement/Measurement Report

A measurement report is used for one or more of various techniques (handover, random access, cell search, etc.) designed to ensure mobility of UEs. Since the measurement report needs a certain degree of coherent demodulation, a UE may perform measurement after acquiring synchronization and physical layer parameters, except for measurement of a received signal strength. The measurement report covers radio resource management (RRM) measurement such as reference signal receive power (RSRP), received signal strength indicator (RSSI) and reference signal received quality (RSRQ) measurement, which are measurements of signal strengths or signal strengths to total reception power of a serving cell and neighbor cells, and radio link monitoring (RLM) measurement, which measures a quality of a link with a serving cell to determine whether radio link failure has occurred.

Regarding the RRM, RSRP is a linear average of power distribution of an RE in which a CRS is transmitted on downlink. RSSI is a linear average of receive powers received by a UE. An OFDM symbol including an RS for antenna port 0 is measured for RSSI. RSSI is a measured value including interference from neighbor cells and noise power. If higher layer signaling indicates a specific subframe for RSRQ measurement, the RSSI is measured for all OFDM symbols included in the indicated subframe. RSRQ is a value measured in the form of N×RSRP/RSSI, where N is the number of RBs of a bandwidth in measurement of the RSSI.

The purpose of RLM is to cause the UE to monitor the downlink quality of a serving cell thereof to determine whether 'in-sync' or 'out-of-sync' is established in the cell. RLM is performed based on the CRS. A downlink quality estimated by the UE is compared with an 'in-sync threshold (Qin)' and an 'out-of-sync threshold (Qout)'. These thresholds may be represented as PDCCH block error rates (BLERs) of the serving cell. In particular, Qout and Qin are set to values corresponding to 10% BLER and 2% BLER, respectively. In reality, Qin and Qout have values corresponding to an SINR of a received CRS. If the reception SINR of the CRS is higher than or equal to a certain level (Qin), the UE determines to remain attached to the cell. If the reception SINR is lower than or equal to a certain level (Qout), the UE declares radio link failure (RLF).

As can be seen from the definition of RSRP given above, it is basically assumed that measurement reporting is performed using CRS. However, in the case in which cells share one PCID, the cells having the same PCID cannot be distinguished from each other based on the CRS. Accordingly, RRM cannot be performed for each of the cells using the measurement report including RSRP/RSRQ based on the CRS alone. Therefore, if the cells share one PCID, RSRP/

RSRQ measurement reporting may be additionally performed based on CSI-RSs which are individually transmitted. To increase reception accuracy in receiving a CSI-RS of a specific cell, neighbor cells do not perform signal transmission in an RE in which the CSI-RS is transmitted. Thereby, measurement may be more accurately performed even though the frequency of CSI-RS transmission is lower than in the case of CRS. Therefore, by performing CRS-based RSRP/RSRQ measurement reporting and CSI-RS RSRP/RSRQ measurement reporting together regardless of whether or not the cells have different PCIDs, accuracy of RRM for a network may be enhanced.

Transmission of CSI-RS from cell is also intended for CSI feedback that a UE performs to assist scheduling of an eNB which determines a rank, a precoding matrix, and a modulation and coding scheme (MCS) (or CQI) that may be used in DL data transmission between a cell and the UE. In a CoMP transmission scheme, the UE needs to feed back CSI even for downlink with a cooperative cell other than a serving cell. Feeding back of CSI for all the cells in a CoMP cluster to which the serving cell of the UE belongs results in excessive overhead. Therefore, CSI may be fed back only for some cells in the CoMP cluster which are worth coordinated scheduling and coordinated data transmission. To determine a CoMP measurement set for a specific UE, RSRP may be configured by selecting cells whose levels are higher than or equal to a certain level. To this end, the UE performs RSRP measurement reporting for the cells in a CoMP cluster to which the UE belongs. Alternatively, an eNB may designate, as a CoMP management set, configurations of the CSI-RSs for which the UE needs to perform RSRP or RSRQ measurement and inform the UE of the designated configurations. Then, the UE may perform RSRP or RSRQ measurement for the CSI-RSs transmitted from the cells belonging to the designated CoMP management set, and when the result of measurement meets a specific condition, the UE may perform reporting.

Additionally, in order to allow for ICIC between CoMP clusters, the UE performs RSRP measurement and reporting for the cells in a neighbor CoMP cluster such that the network and the UE identify a cell of the neighbor CoMP cluster that applies strong interference to the UE and a cell to which the UE applies strong UL interference.

Along with CRS-based RSRP/RSRQ measurement reporting for mobility management of, for example, handover of a UE CSI-RS-based RSRP/RSRQ measurement reporting may be performed to implement configuration of a CoMP measurement set and ICIC. Thereby, accuracy of RRM and flexibility of the network may be enhanced.

D2D communication involves a serving UE (hereinafter, dTUE or second UE) to transmit data and a receive UE (hereinafter, dRUE or first UE) to receive data from the second UE. In this case, the first UE receives data from the second UE through a link to the second UE, and accordingly needs to perform RRM/RLM for the second UE similar to conventional RRM/RLM for the eNB. Hereinafter, a detailed description will be given of D2D RRM/RLM according to one embodiment of the present invention.

D2D Link Monitoring (DLM)

Figure 6:
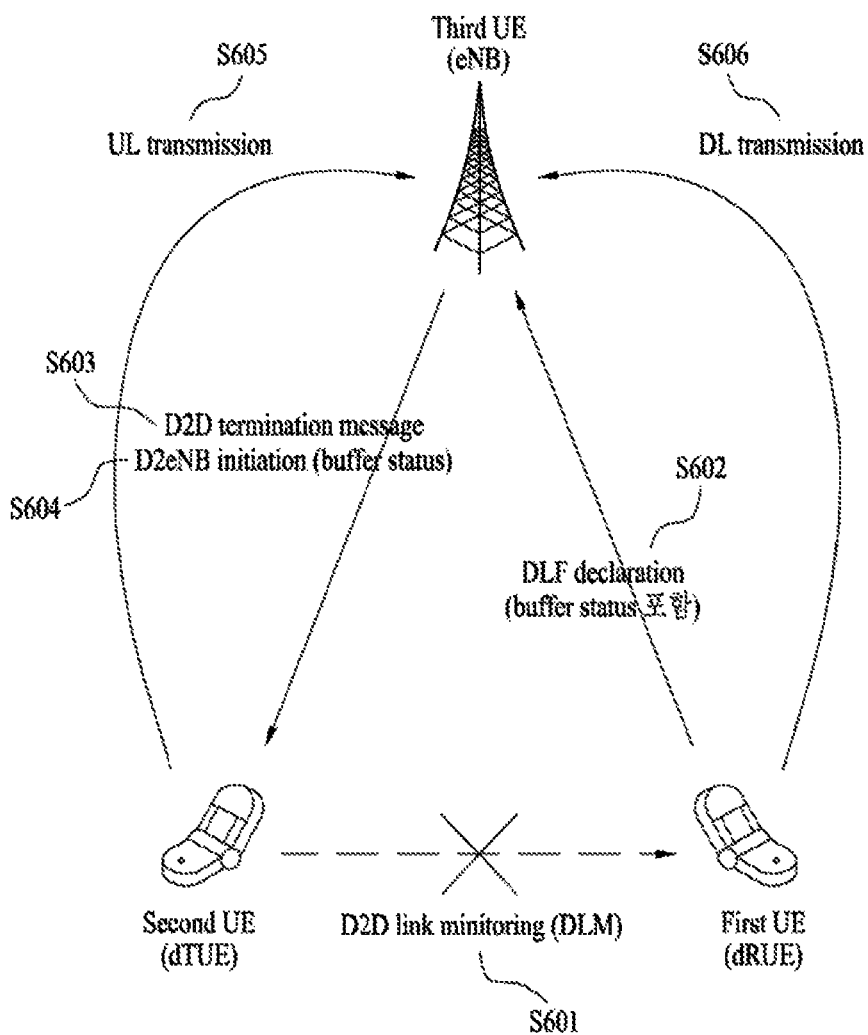
FIG. 6 is a diagram illustrating an interference situation which may occur during D2D communication.

According to one embodiment of the present invention, D2D link monitoring (DLM) performed using a method illustrated in FIG. 6 is proposed. A detailed description will be given below with reference to FIG. 6. In the example of FIG. 6, it is assumed that a D2D link is established between the first UE and the second UE, and the first UE receives data from the second UE. While the eNB is illustrated as serving as a third UE, another UE (a master UE of the D2D cluster) may serve as the third UE. In addition, while FIG. 6 illustrates D2D communication within the same cell (eNB), D2D communication may also be applied to UEs from different cells.

Referring to FIG. 6, in step S601, the first UE monitors a D2D link with the second UE while receiving data from the second UE. That is, the first UE measures a quality of the D2D link. Herein, monitoring of the D2D link may be performed on a predetermined time-frequency resource, which will be described later.

In step S602, if a BLER (or SINR corresponding to BLER) of a control signal/data signal for the link measurement result is less than a preset value, the first UE declares failure of the D2D link (with the second UE), and transmits the same to the third UE.

Herein, the D2D link failure (DLF) may include information indicating that the D2D link with the second UE has failed and/or buffer state information associated with the data being received from the second UE. As described later, the buffer state information may be used to receive, from the third UE, the remaining part of the data which the first UE was receiving from the first UE through D2D communication, after link failure is declared. In other words, the buffer state information serves as an indicator allowing data to be received with continuity thereof maintained even if communication link switching is caused by a sudden change in the link quality and DLF during D2D communication.

In step S603, the third UE receives, from the first UE, the DLF including the buffer state information, and signals to the second UE that D2D transmission has been terminated. This process is required to be performed in the case in which the DLF of the first UE is not reported to the second UE through a separate procedure/resource. However, this process may be omitted if the monitoring process for the D2D link is defined in the second UE, and the RLF declaration according to the process is made at a time similar to the time at which the first UE declares the RLF.

In step S604, the third UE may signal a D2eNB initiation message in order to switch the terminated D2D transmission to D2eNB (i.e., communication with the eNB of the D2D UEs) transmission. At this time, the buffer state information received from the first UE is transmitted to the second UE.

In step S605, the second UE recognizes that the D2D link with the first UE has been terminated, and transmits the remaining part of the data which was being transmitted to the first UE to the third UE through UL transmission. Herein, the remaining part of the data which was being transmitted to the first UE is determined based on the buffer state information received from the third UE.

In step S606, the third UE may deliver the remaining data received from the second UE to the first UE through DL transmission. Actual data transmission may include signaling and data transmission between the eNB and a gateway. That is, the description give above may also be applied to a D2D link between UEs from different cells.

Signaling for DLM/DRM (D2D Resource Monitoring)

To implement DLM/DRM (D2D Resource Monitoring), the second UE or the third UE may signal the following information to the first UE. The information pieces described below may be signaled independently or in combination thereof. As a signaling method, RRC signaling, control information signaling, or the like may be used. The term "measurement" employed in the following description may be understood as a concept covering signaling strength detection, energy detection on signaled resources, and correlation for sequence detection.

The information for DLM/DRM that a D2D UE receives includes time-frequency resource position information for measurement. In other words, the second or the third UE may signal a time-frequency resource region which the first UE needs to measure. Herein, the position of the time resource may include a starting position, an ending position, and a measurement period and interval, and be signaled in units of subframes/slots/OFDM symbols. Signaling may also be performed in units of subframe sets/slot sets/OFDM symbol sets. Similarly, the frequency resource position may include a starting position, an ending position, and a measurement period and interval. The frequency resource position may be signaled in units of resource blocks (RBs) or resource block groups (RBGs). Carrier frequency and bandwidth information used to transmit a signal to be measured may also be signaled.

The information for DLM/DRM may include information about a reference signal/discovery signal configuration. In the case in which signals (UL SRS, UL DMRS, DL DMRS, DL CSI-RS, etc.) defined in the legacy LTE/LTE-A system are used for D2D communication, a signal to perform measurement for the DLM/DRM and a configuration of the signal (e.g., an RS port, a scrambling (or sequence) parameter, a period, an interval, etc.) may be signaled. If a separate reference signal/discovery signal for D2D is used, configurations related to these signals may be signaled. In the case in which only a part of the full frequency band is used for D2D communication or the exemplary signals mentioned above use only a part of the frequency band in relation to D2D communication, information indicating the corresponding frequency band also needs to be signaled. In this case, the information indicating the frequency band may employ the aforementioned method of signaling the frequency resource position.

The information for DLM/DRM may include measurement scheme information. That is, a type of the measurement to be performed by the first UE may be signaled. For example, measurement (of signal strength) using position information about a specific signal such as a specific RSRP and SINR and the configuration of the signal may be signaled. Alternatively, a measurement method may be signaled in a manner of instructing measurement of energy in a specific time-frequency region. Alternatively, implementation of correlation with a specific sequence in a specific time-frequency region may be signaled.

Subsequently, the information for DLM/DRM may include reporting period information. That is, periodicity of reporting a measurement result to the second UE or the third UE may be signaled. If measurement reporting is performed in a manner of event triggering, this information may be excluded. Instead, a condition for event triggering may be signaled. The measurement result may be reported when the measurement result satisfies, for example, a specific SINR and BLER, which are conditions for event triggering.

Signaling of Measurement Set

D2D communication may take a different form according to uses thereof such as 1:1 communication, and 1:m communication representing 'many-to-one' or 'one-to-many' communication between UEs. If different forms of D2D communication are implemented, measurement for each of the forms may be needed. Specifically, for 1:1 communication, measurement may only need to be performed for a corresponding region in which transmission and reception are performed. For 1:m communication, measurement of a wider range (in the frequency domain) may be needed. In the case of measurement for searching, measurement of receive signal strength in a specific region (a candidate region in which D2D communication is possible) may be needed to reduce complexity.

For various uses/forms of D2D communication as above, a measurement set may be configured for each use and signaled to the D2D UEs.

Figure 7:
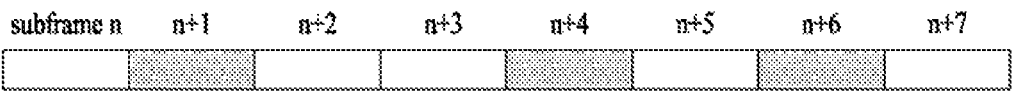
FIG. 7 is a diagram illustrating a measurement resource according to one embodiment of the present invention.

For example, a subframe set for measurement (a subframe set in which D2D transmission is performed or a subframe set in which the second UE transmits a reference signal/discovery signal) may be signaled to the first UE carrying out 1:1 communication. In addition to the subframe set, a configuration (e.g., a transmission resource region (OFDM symbol, RB, RS offset, etc.)) of a reference signal/discovery signal which the first UE needs to measure in the signaled subframe set. For example, as shown in FIG. 7M a subframe set including subframes n+1, n+4 and n+6 may be signaled as a subframe set for measurement.

A subframe set for D2D data transmission and a subframe set for measurement may be independently signaled. For example, referring to FIG. 7, a subframe set used for D2D communication includes subframes n+1, n+2, n+3, n+4, n+6 and n+7. When it is assumed that a reference signal/discovery signal is transmitted in subframes n+1, n+4 and n+6, the two subframe sets may be independently signaled.

Upon receiving the information about the subframe sets as described above, the first UE may report a measurement result based on the information. When the second or third UE receives the report, it may evaluate the D2D link quality, and determine whether a corresponding D2D pair is to perform D2D transmission or 1:1 transmission through a D2eNB link.

In another example, a subframe set different from the subframe sets described in the previous example may be signaled such that measurement/demodulation for multiple D2D signals are performed. To this end, the third UE may signal a subframe set for multiple D2D signal transmissions and a frequency resource (the bandwidth of the frequency resource may be divided into multiple subsets, each of which may include a frequency band necessary for actual transmission and a guard interval). For 'many-to-one' or 'one-to-many', a resource specific configuration may be signaled, unlike in the case of 1:1 D2D communication. Thereby, overhead may be reduced compared to the case in which every configuration for the respective subsets is signaled.

As a subframe set for another purpose, there may be a subframe set for measurement for searching resources available for D2D transmission. The third UE may signal, to the first and/or second UE, this subframe set and a subset in the frequency domain in which energy detection needs to be performed within the subframe set. The first and/or second UE may perform and report energy detection based on the received information and report. When the third UE receives the report, it may perform resource scheduling. For example, for a time-frequency region in which high energy is detected, the third UE may perform scheduling, determining that a UE using the region is around the third UE. When measurement is restricted to energy detection, additional signaling of a reference signal configuration may not be needed.

Figure 8:
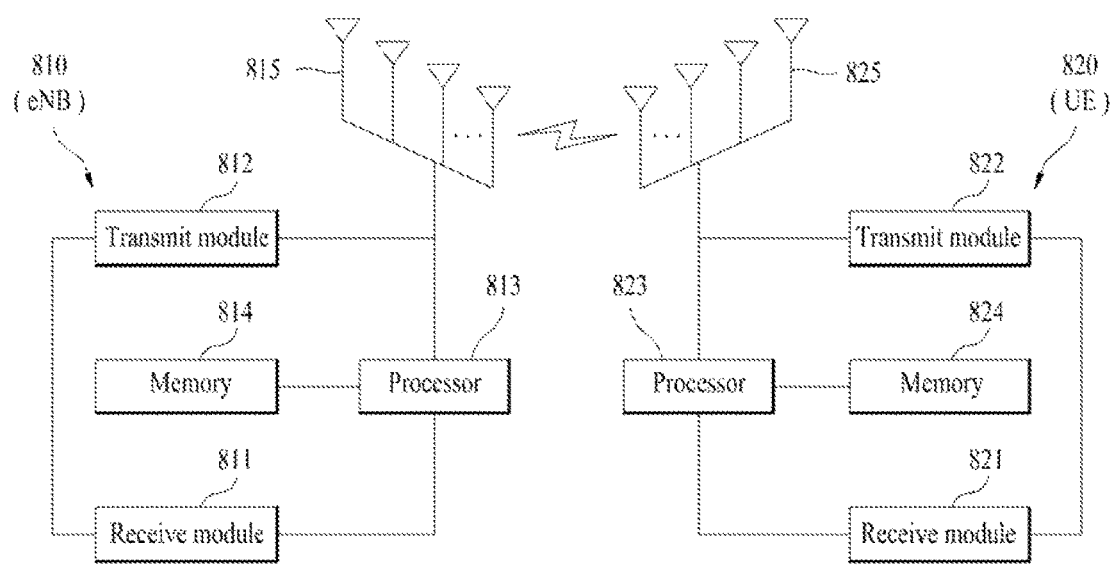
FIG. 8 is a diagram illustrating configurations of transceivers.

FIG. 8 is a diagram illustrating configurations of an eNB and a UE according to one embodiment of the present invention.

Referring to FIG. 8, an eNB 810 may include a receive module 811, a transmit module 812, a processor 813, a memory 814, and a plurality of antennas 815. The antennas 815 represent an eNB that supports MIMO transmission and reception. The receive module 811 may receive various signals, data and information from a UE on uplink. The transmit module 812 may transmit various signals, data and information to a UE on downlink. The processor 813 may control overall operation of the eNB 810.

The processor 813 of the eNB 810 according to one embodiment of the present invention may operate to implement the embodiments described above.

Additionally, the processor 813 of the eNB 810 may function to operationally process information received by the eNB 810 or information to be transmitted from the eNB 810, and the memory 814, which may be replaced with an element such as a buffer (not shown), may store the processed information for a predetermined time.

Referring to FIG. 8, a UE 820 may include a receive module 821, a transmit module 822, a processor 823, a memory 824, and a plurality of antennas 825. The antennas 825 represent a UE that supports MIMO transmission and reception. The receive module 821 may receive various signals, data and information from the eNB on downlink. The transmit module 822 may transmit various signals, data and information to the eNB on uplink. The processor 823 may control overall operation of the UE 820.

The processor 823 of the UE 820 according to one embodiment of the present invention may perform operations necessary for implementation of the embodiments described above.

Additionally, the processor 823 of the UE 820 may function to operationally process information received by the UE 820 or information to be transmitted from the UE 820, and the memory 824, which may be replaced with an element such as a buffer (not shown), may store the processed information for a predetermined time.

The configurations of the eNB and the UE as described above may be implemented such that the above-described embodiments are independently applied or two or more thereof are simultaneously applied, and description of redundant parts is omitted for clarity.

Description of the eNB 810 in FIG. 8 may be equally applied to a relay as a downlink transmitter or an uplink receiver, and description of the UE 820 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to have the widest scope corresponding to the principles and novel features disclosed herein The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to have the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention as described above are applicable to various mobile communication systems.

The invention claimed is:

1. A method for carrying out device-to-device (D2D) communication by a first terminal in a wireless communication system, the method comprising:
receiving from a base station, information comprising a subframe set in which a reference signal is transmitted and a configuration of the reference signal;
measuring a link with a second terminal using the configuration of the reference signal in the subframe set; and
transmitting a link failure declaration to the base station when a result of the measuring satisfies a predetermined condition,
wherein the link failure declaration comprises buffer state information related to data being received from the second terminal,
wherein the first terminal receives a remaining part of the data from the base station, and
wherein the subframe set and the configuration of the reference signal are configured differently according to whether the first terminal performs a 1:1 D2D transmission or the first terminal performs a many-to-one or one-to-many D2D transmission.

2. The method according to claim 1, wherein the buffer state information is delivered from the base station to the second terminal.

3. The method according to claim 2, wherein the remaining part of the data is transmitted to the base station by the second terminal based on the buffer state information.

4. The method according to claim 1, wherein the predetermined condition is that a block error rate (BLER) of a control signal becomes less than or equal to a predetermined value.

5. The method according to claim 1, wherein the buffer state information is an index of a packet successfully received from the second terminal.

6. The method according to claim 1, wherein the buffer state information is either a transmission block index or an IP packet sequence number.

7. A method for carrying out device-to-device (D2D) communication by a base station in a wireless communication system, the method comprising:
  transmitting information comprising a subframe set in which a reference signal is transmitted and a configuration of the reference signal to a first terminal; and
  receiving a link failure declaration from the first terminal,
  wherein the link failure declaration comprises buffer state information related to data being received from a second terminal by the first terminal,
  wherein the base station transmits a remaining part of the data to the first terminal, and
  wherein the subframe set and the configuration of the reference signal are configured differently according to whether the first terminal performs a 1:1 D2D transmission or the first terminal performs a many-to-one or one-to-many D2D transmission.

8. The method according to claim 7, further comprising:
  transmitting the buffer state information to the second terminal.

9. The method according to claim 8, wherein the remaining part of the data is transmitted to the base station by the second terminal based on the buffer state information.

10. The method according to claim 7, wherein the link failure declaration is transmitted when a block error rate (BLER) of a control signal is less than or equal to a predetermined value as a result of link measurement of the first terminal.

11. The method according to claim 7, wherein the buffer state information is an index of a packet successfully received from the second terminal.

12. The method according to claim 7, wherein the buffer state information is either a transmission block index or an IP packet sequence number.

13. The method according to claim 7, further comprising:
  transmitting, to the first terminal, a time-frequency resource for the first terminal measuring a link with the second terminal.

* * * * *